US 6,616,154 B1

(12) United States Patent
Neuhold

(10) Patent No.: US 6,616,154 B1
(45) Date of Patent: Sep. 9, 2003

(54) KICK SCOOTER

(76) Inventor: Erwin Neuhold, Leopoldhofweg 9/39, A-8160 Weiz (AT)

( * ) Notice: Subject to any disclaimer, the term of this patent is extended or adjusted under 35 U.S.C. 154(b) by 0 days.

(21) Appl. No.: 09/937,280

(22) PCT Filed: Mar. 22, 2000

(86) PCT No.: PCT/AT00/00065
§ 371 (c)(1),
(2), (4) Date: Sep. 24, 2001

(87) PCT Pub. No.: WO00/58146
PCT Pub. Date: Oct. 5, 2000

(30) Foreign Application Priority Data

Mar. 25, 1999 (AT) .............................................. 554/99

(51) Int. Cl.[7] .............................................. B62M 1/00
(52) U.S. Cl. .................................................. 280/87.05
(58) Field of Search ........................ 280/87.01, 87.021, 280/87.041, 87.042, 87.05, 842, 655, 603, 639

(56) References Cited

U.S. PATENT DOCUMENTS

| 1,443,114 | A | * | 1/1923 | Bauder ..................... 280/87.05 |
| 1,516,105 | A | * | 11/1924 | Kinoshita .............. 280/87.041 |
| 2,546,711 | A | * | 3/1951 | Amendt ..................... 280/87.05 |
| 3,177,000 | A | * | 4/1965 | Alexander ................... 280/655 |
| 3,710,883 | A | | 1/1973 | Rizzo |
| 4,637,626 | A | * | 1/1987 | Foss et al. .................... 280/655 |
| 5,251,934 | A | * | 10/1993 | Gates ........................... 280/842 |
| 5,318,312 | A | * | 6/1994 | Montemayor ............ 280/87.01 |
| 5,769,438 | A | * | 6/1998 | Svetlov .................. 280/87.041 |
| 5,868,408 | A | * | 2/1999 | Miller .................... 280/87.042 |
| 6,435,529 | B1 | * | 8/2002 | Stewart et al. ........... 280/87.05 |

FOREIGN PATENT DOCUMENTS

| WO | 88/07467 | * | 10/1988 | ............ 280/87.042 |
| WO | WO 99/00290 | | 1/1999 | |

* cited by examiner

Primary Examiner—Frank Vanaman
(74) Attorney, Agent, or Firm—Collard & Roe, P.C.

(57) ABSTRACT

A foldable kick scooter comprising a footboard (1) which forms bearing forks (2, 3) for wheels (4, 5) and on which is held a guide bearing (6) for the bearing forks (2) of the front wheel (4) which is connected to a steering column (11) which is divided into linked elements and can be swiveled about a transversal axle (13) against the footboard (1). In order to provide advantageous construction conditions it is proposed that both the guide bearing (6) for the front bearing fork (2) as well as the rear bearing fork (3) are held downwardly swivelable about parallel transversal axles (7, 22) towards the footboard (1) and that the footboard (1) forms two through-openings (23) for the swiveled wheels (4, 5).

3 Claims, 2 Drawing Sheets

KICK SCOOTER

CROSS REFERENCE TO RELATED APPLICATIONS

Applicant claims priority under 35 U.S.C. §119 of Austrian Application No. A 554/99, filed on Mar. 25, 1999. Applicant also claims priority under 35 U.S.C. §120 of PCT/AT00/00065, filed on Mar. 22, 2000. The international application under PCT article 21(2) was not published in English.

BACKGROUND OF THE INVENTION

The invention relates to a foldable kick scooter with a footboard forming bearing forks on which is held a guide bearing for the bearing fork of the front wheel which is connected to a steering column which is divided into linked elements and can be swiveled about a transversal axle against the footboard.

DESCRIPTION OF THE PRIOR ART

In order to provide a foldable kick scooter which shows relatively small dimensions in the folded state it is known (WO 99/00 290 A1) to subdivide the footboard by a central hinge, so that the two footboard parts can be swiveled downwardly against one another. Since moreover the guide bearing for the steering column forming the bearing fork for the front wheel is disposed on a support which is held swivelably on the footboard about a swiveling axis which is parallel to the hinge axis of the footboard, the steering column, which itself is divided into linked elements, can be moved from an operating position to an idle position swiveled towards the footbard in which the mutually swivelable parts of the steering column come to lie upon one another. The disadvantage in this known construction is especially that during the swiveling together of the two mutually hinged footboard parts, the wheels swiveled against one another come to lie above one another and thus substantially determine the overall height of the folded kick scooter. This known construction therefore requires wheels with comparably small diameters. This, however, is accompanied by unfavorable rolling properties especially on uneven pavements.

In a foldable motor scooter (U.S. Pat. No. 3,710,883 A), a pivot means arm for the rear wheel which is swivelably held in a frame-like chassis can be swiveled after the removal of the supporting control arm shafts and the removal of the seat upwardly about an inclined transversal axis between the side parts of the frame on which an extension arm is linked for fixing the guide bearing for the bearing fork of the front wheel. Since the part of the extension arm which carries the guide bearing can be additionally swiveled back by an inclined transversal axis against the chassis once a supporting frame connecting the guide bearing with the chassis has been removed, the front wheel, once the control arm shaft has been removed, can be swiveled upwardly about the inclined transversal axis between the two parts of the extension arm in order to be swiveled jointly with the two parts of the extension arm about the link axis of the extension arm on the chassis against the same. As a result of the inclined transversal axes about which both the front as well as the rear wheel can be swiveled, the two wheels come to lie next to one another between the side parts of the chassis, which ensures small dimensions of the foldable motor scooter. This, however, requires considerable complexity in the construction which requires a chassis which is unsuitable for a kick scooter.

SUMMARY OF THE INVENTION

The invention is thus based on the object of providing a foldable kick scooter of the kind mentioned above in such a way that despite the use of comparably large running wheels it can be folded in an advantageous manner into an idle position with a low overall height.

This object is achieved by the invention in such a way that both the guide bearing for the front bearing fork as well as the rear bearing fork are held about parallel lateral axles swivelable in the downward direction against the footboard and that the footboard forms two through-openings for the swiveled wheels.

Since as a result of these measures merely the bearing forks for the front and the rear wheel are swiveled downwardly against the footboard, the wheels do not come to lie above one another as in a centrally divided footboard, but instead behind one another, so that in providing respective through-openings for the wheels in the footboard, the bearing forks can be placed flatly against the footboard. This fulfills an important precondition for the low overall height of the folded kick scooter. The steering column can then also be folded according to its breakdown into linked elements.

Since the swivelability of the guide bearing is used for swiveling off the front wheel and not for swiveling in the steering column against the footboard, the steering column held in the guide bearing could comprise a first hinge directly above the guide bearing. Particularly advantageous constructional conditions are obtained, however, when the steering column is not held in the guide bearing but on the front bearing fork about an axle parallel to the wheel axle and can be swiveled off from the operating position to an idle position which is substantially parallel to the bearing fork because in this case the guide length of the bearing guide does not play any role for the arrangement of the lowermost hinge for the steering column. The steering column is held swivelably on the bearing fork. This support of the steering column which is eccentric with respect to the guide bearing must not lead to any steering difficulties, however. It is therefore necessary to ensure that the steering column extends in its operating position at least substantially coaxially to the guide bearing. In order to ensure supporting conditions for the steering column, which are advantageous for such an operating position, the steering column can be provided with a supporting stop which rests in the operating position of the steering column on the free face surface of a bearing bolt of the front bearing fork which is held in the guide bearing.

BRIEF DESCRIPTION OF THE DRAWINGS

The subject matter of the invention is shown by way of examples in the drawings, wherein.

DETAILED DESCRIPTION OF THE PREFERRED EMBODIMENTS

Figure 1:
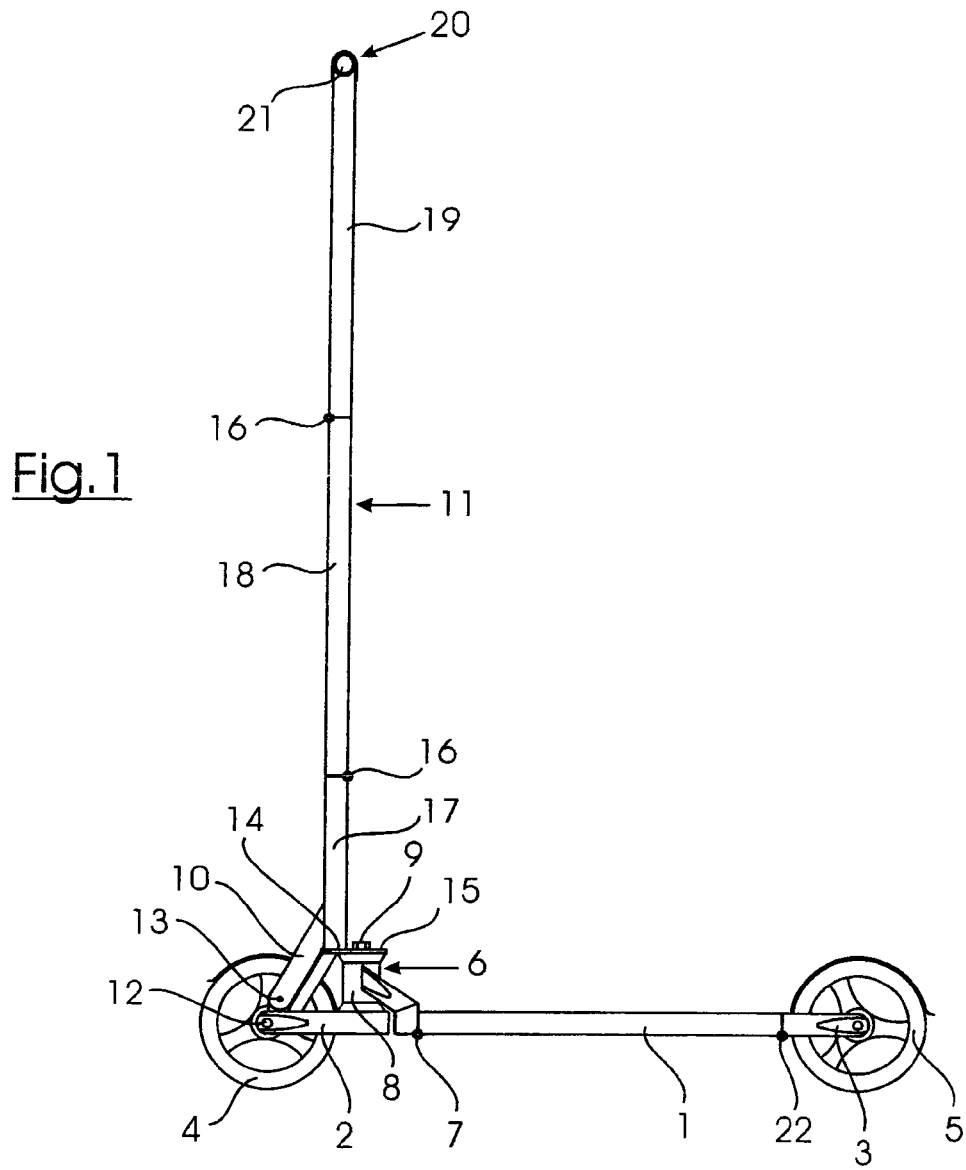
FIG. 1 shows a foldable kick scooter in accordance with the invention in a simplified side view.
Figure 2:
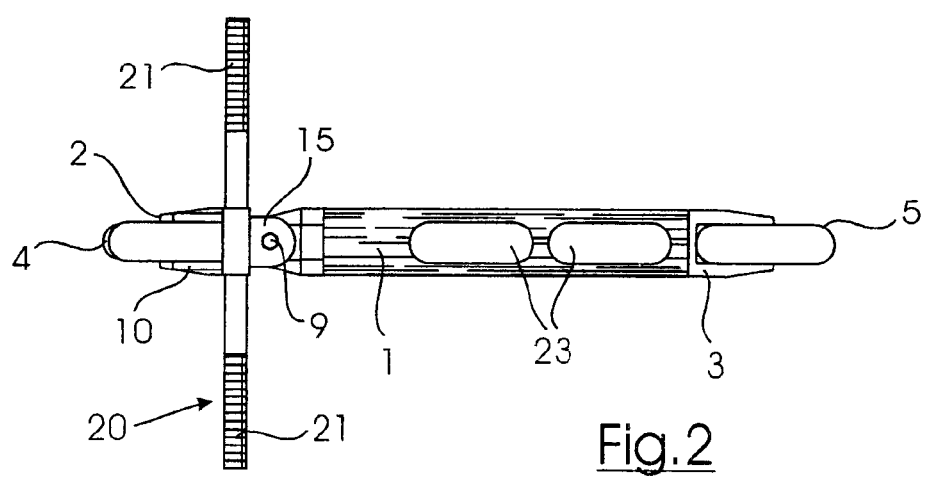
FIG. 2 shows the kick scooter in a top view.
Figures 3, 4:
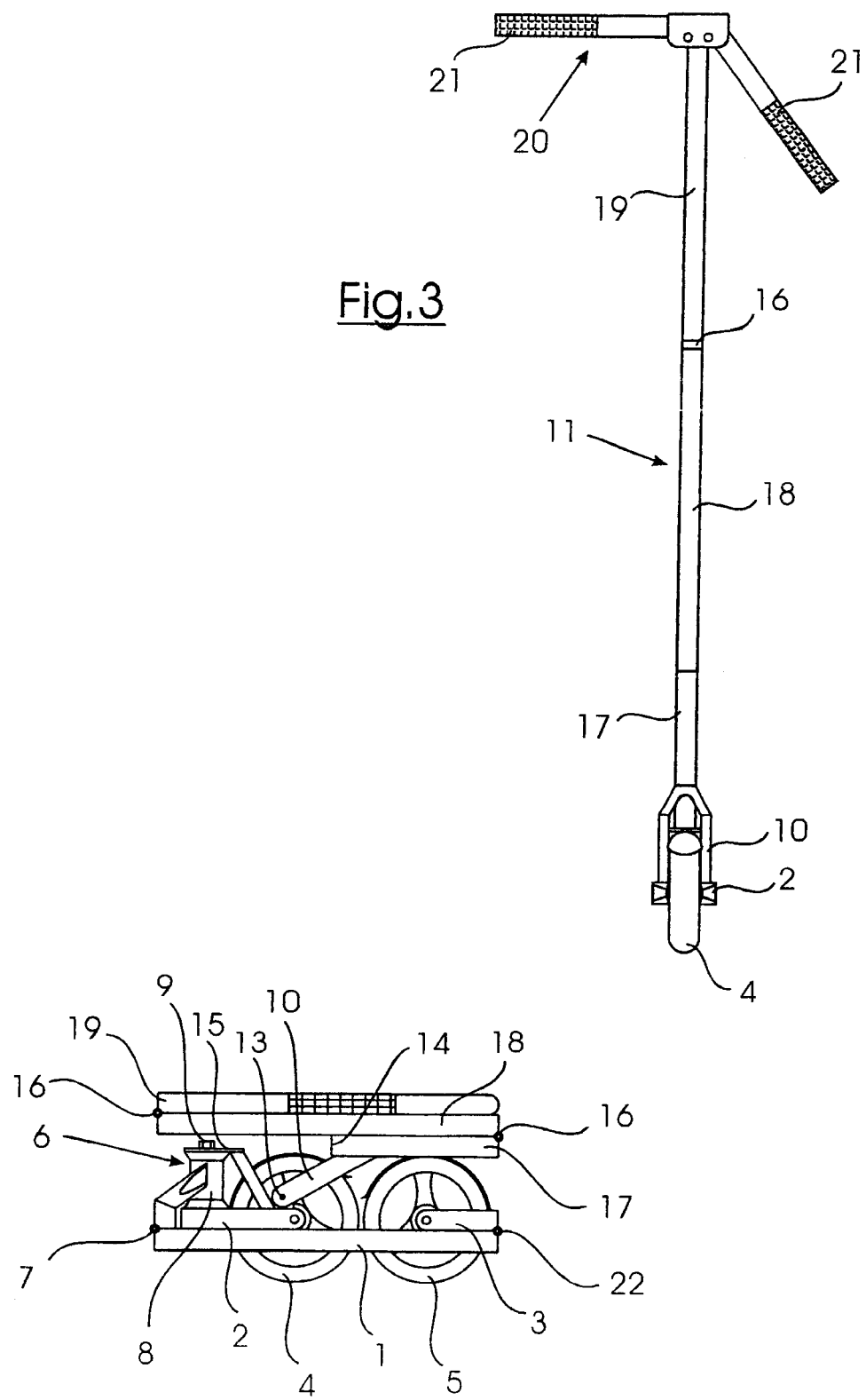
FIG. 3 shows the kick scooter in a front view.
FIG. 4 shows the kick scooter in the folded state.

The foldable kick scooter according to the illustrated embodiment comprises a footboard with the bearing forks 2, 3 for a front and rear running wheel 4, 5. The bearing fork 2 for the front running wheel 4 is rotatably held in a guide bearing 6 which is mounted on the footboard 1 around a lateral axle 7 and can be swiveled downwardly in the manner of a hinge. The guide bearing 6 consists of a bearing bush 8 and a bearing journal 9 for the bearing fork 2 which is held rotatably in the bearing bush 8. Located on the bearing fork 2 at a distance in front of the guide bearing 6, a fork arm 10 for a steering column 11 is swivelably held about an axle 13 which is parallel to the wheel axle 12. The steering column 11 rests in the operating position as shown in FIGS. 1 to 3 with a supporting stop 14 on a stop plate 15 of the bearing journal 9 and is locked in this supporting position by means of a detachable hook for example. The steering column 11 is subdivided into three articulated sections 17, 18, 19 by means of hinges 16 which can be locked in the designated operating position, of which the uppermost section 19 carries a handlebar 20 which consists of two handle parts 21 which can be swiveled down against the section 19.

As also the bearing fork 2 for the front wheel 4, the bearing fork 3 for the rear wheel 5 is held on the footboard 1 swivelable about a transversal axle 22 in a hinge-like manner. To ensure that the wheels 4 and 5 do not press against the footboard 1 when the wheels 4 and 5 are swiveled off against the footboard, the footboard 1 is provided with through-openings 23 for the wheels 4 and 5.

For the purpose of folding the kick scooter, the wheels 4 and 5 are swiveled in with their bearing forks 2 and 3 against the lower side of the footboard 1 until the bearing forks 2 and 3 rest on the lower side of the footboard, with the wheels 4 and 5 passing through the through-openings 23 in footboard 1, as shown in FIG. 4, in which the footboard 1 of the folded kick scooter shows upwards with its lower side. After unlatching the steering column 11 with respect to the guide bearing 6, the steering column can be swiveled down about axle 13 and can be folded after the unlatching of the hinges 16 in such a way that the sections 17, 18 and 19 of the steering column 11 come to lie approximately parallel to the footboard 1, as is shown in FIG. 4. Despite the comparably large diameter of the wheels, a low overall height for the folded kick scooter is achieved, and this with comparably simple constructional means. The handles 21 which are swiveled in against the upper section 19 of the steering column 11 in the folded state of the kick scooter can lie within the width of the footboard 1 in the case of the usual dimensions, so that the size of the folded kick scooter can be kept small both with respect to the height as well as the width and the length.

What is claimed is:

1. A foldable kick scooter comprising a footboard forming front and rear bearing forks for front and rear wheels rotatable about front and rear wheel axes, a guide bearing for the front bearing fork held on the footboard, and a steering column connected to the guide bearing, the steering column being divided into linked elements, the guide bearing and the rear bearing fork being downwardly swivelable towards the footboard about transverse axes extending parallel to each other, and the footboard defining two through-openings adapted to receive the front and rear wheels swiveled downwardly with the guide bearing and rear bearing fork.

2. The foldable kick scooter of claim 1, wherein the steering column is rotatable on the front bearing fork about an axis extending parallel to the front wheel axis for swiveling the steering column from an upright operating position to an idle position wherein the steering column is substantially parallel to the front bearing fork.

3. The foldable kick scooter of claim 2, further comprising a supporting stop on the steering column, the supporting stop being arranged to engage a bearing journal on the front bearing fork in the operating position of the steering column.

* * * * *